United States Patent [19]

Kawashima et al.

[11] Patent Number: 4,652,592
[45] Date of Patent: Mar. 24, 1987

[54] METHOD OF PRODUCING SHAPED BODY OF CROSS-LINKED FLUORINE-CONTAINING GRAFT COPOLYMER BY USING RADIATION

[75] Inventors: Chikashi Kawashima; Shinji Ogasawara, both of Kamifukuoka; Isao Tanaka, Kawagoe; Yasufumi Koga, Tokorozawa, all of Japan

[73] Assignee: Central Glass Company, Limited, Ube, Japan

[21] Appl. No.: 753,983

[22] Filed: Jul. 11, 1985

[30] Foreign Application Priority Data

Jul. 11, 1984 [JP] Japan ................................. 59-142196

[51] Int. Cl.$^4$ ........................ C08F 285/00; C08F 2/46
[52] U.S. Cl. ..................................... 522/117; 525/281
[58] Field of Search ......................... 522/117; 525/281

[56] References Cited

U.S. PATENT DOCUMENTS 3,539,488 11/1970 Klopfer et al. ...................... 522/117
3,947,525 3/1976 Robertson et al. ............ 204/159.17
4,155,823 5/1979 Gotcher et al. ...................... 522/117
4,472,557 9/1984 Kawashima et al. ................ 525/276

Primary Examiner—Joseph L. Schofer
Assistant Examiner—Bernard Lipman
Attorney, Agent, or Firm—Fleit, Jacobson, Cohn & Price

[57] ABSTRACT

The disclosure relates to enhancement of mechanical strength and heat resistance of a graft copolymer which is obtained by graft copolymerization of a fluorine-containing monomer that gives a crystalline polymer, such as vinylidene fluoride, with an elastomeric copolymer having peroxy bond, such as a ternary copolymer of vinylidene fluoride, chlorotrifluoroethylene and an unsaturated peroxy compound. A small amount of triallylisocyanurate is mixed with the graft copolymer, and the mixture is formed into a desired shape by a usual method such as calendering or compression moulding. The shaping material is exposed to ionizing radiation such as gamma-ray, which causes cross-linking of the graft copolymer.

12 Claims, 5 Drawing Figures

METHOD OF PRODUCING SHAPED BODY OF CROSS-LINKED FLUORINE-CONTAINING GRAFT COPOLYMER BY USING RADIATION

BACKGROUND OF THE INVENTION

This invention relates to cross-linking of a fluorine-containing graft copolymer by exposure to ionizing radiation after forming the copolymer into a desired shape.

For rubbers and also for some other types of polymers, cross-linking is an important means of improving or desirably modifying the physical properties. Usually cross-linking is accomplished by using a cross-linking agent. For example, polyamine, peroxide or polyol is used for cross-linking of fluororubbers.

It is known that some polymers can be cross-linked by ionizing radiation. In short, cross-linking reaction takes place if suitable free radicals are produced in the chain of the irradiated polymer and if these radicals combine with one another at a relatively high rate. This method is important for thermoplastic polymers and is industrially employed for producing cross-linked polyethylene.

Furthermore, researches have been made on the radiation-induced cross-linking of some fluororubbers and fluorocarbon resins. For example, Japanese patent application publication No. 48-38465 shows that tetrafluoroethylene/propylene copolymer rubber can be cross-linked at a relatively low exposure dose by adding an allyl compound to the rubber, though the addition of such a compound is not an indispensable requisite for radiation-induced cross-linking, and U.S. Pat. No. 3,947,525 shows that the addition of an allyl compound to a fluorocarbon resin is effective in enhancing the tensile strength and thermal properties by irradiation. Japanese patent application provisional publication No. 59-62635 relates to radiation-induced cross-linking of a thermoplastic fluororubber after moulding and shows that in this case the addition of an allyl compound is not appreciably effective and that a sufficient effect of irradiation is obtained without adding such a compound in advance.

Meanwhile, fluorine-containing graft copolymers are attracting increasing interest since such copolymers are capable of uniting the properties characteristic of a fluorocarbon resin and flexibility or elasticity of a fluororubber. Typical examples of promising fluorine-containing graft copolymers are ones shown in U.S. Pat. No. 4,472,557, which can be formed into various shapes and will have wide uses. More particularly, the disclosure of this patent includes elastic copolymers obtained by graft copolymerization of a fluorine-containing monomer that gives a crystalline polymer, such as vinylidene fluoride, with a basic fluoroelastomer which is a copolymer having peroxy bonds in the polymer chain. The grafting is accomplished by thermal decomposition of the peroxy bonds. These fluorine-containing graft copolymers are excellent in mechanical properties, chemical resistance and mouldability. However, when substituting these graft copolymers for conventional fluororubbers sometimes it is desirable to improve the high temperature characteristics and mechanical strength of the graft copolymers.

SUMMARY OF THE INVENTION

It is an object of the present invention to provide a method of improving fluorine-containing graft copolymers such as the ones shown in U.S. Pat. No. 4,472,557 in both high temperature characteristics and some mechanical properties such as tensile strength, elongation at break and permanent set by compression.

In other words, it is an object of the invention to provide a method of producing a shaped body of a fluorine-containing graft copolymer with improved high temperature characteristics and mechanical strength.

For producing a shaped body of a fluorine-containing graft copolymer, a method according to the invention comprises the steps of preparing a mixture of 100 parts by weight of a fluorine-containing graft copolymer and from 0.1 to 10 parts by weight of triallylisocyanurate, forming the mixture into a desirably shaped body by application of heat, and exposing the shaped body to ionizing radiation to thereby cause cross-linking of the graft copolymer formed into the shaped body. The fluorine-containing graft copolymer used in this method is one obtained by graft copolymerization of a fluorine-containing monomer which gives a crystalline polymer with a fluorine-containing elastomeric copolymer having peroxy bonds that decompose at the graft copolymerization stage.

It is suitable to control the exposure dose within the range from 0.1 to 20 Mrad. The type of ionizing radiation is not particularly specified. For example, alpha-ray, beta-ray, gamma-ray or X-ray may be used.

By adding an appropriate quantity of triallylisocyanurate before a shaping operation such as calendering, compression moulding or extrusion and by exposing the shaped body ionizing radiation, it is possible to remarkably improve the mechanical properties of the shaped graft copolymer, particularly in tensile strength, elongation at break and permanent set by compression. At the same time heat resistance of the shaped material is considerably enhanced. In many cases the shaped material after radiation-induced cross-linking does not melt and does not lose shape until the temperature far exceeds 200° C.

It deserves special mention that without addition of triallylisocyanurate the exposure of the above defined fluorine-containing graft copolymer to ionizing radiation does not produce improvements on the mechanical strength or high temperature characteristics and, rather, results in some degradation of the mechanical properties. This fact indicates that the mechanism of radiation-induced cross-linking of the fluorine-containing graft copolymers used in this invention differs essentially from that in either of the aforementioned tetrafluoroethylene/propylene rubber and the aforementioned thermoplastic fluororubber.

DESCRIPTION OF THE PREFERRED EMBODIMENTS

Figure 1:
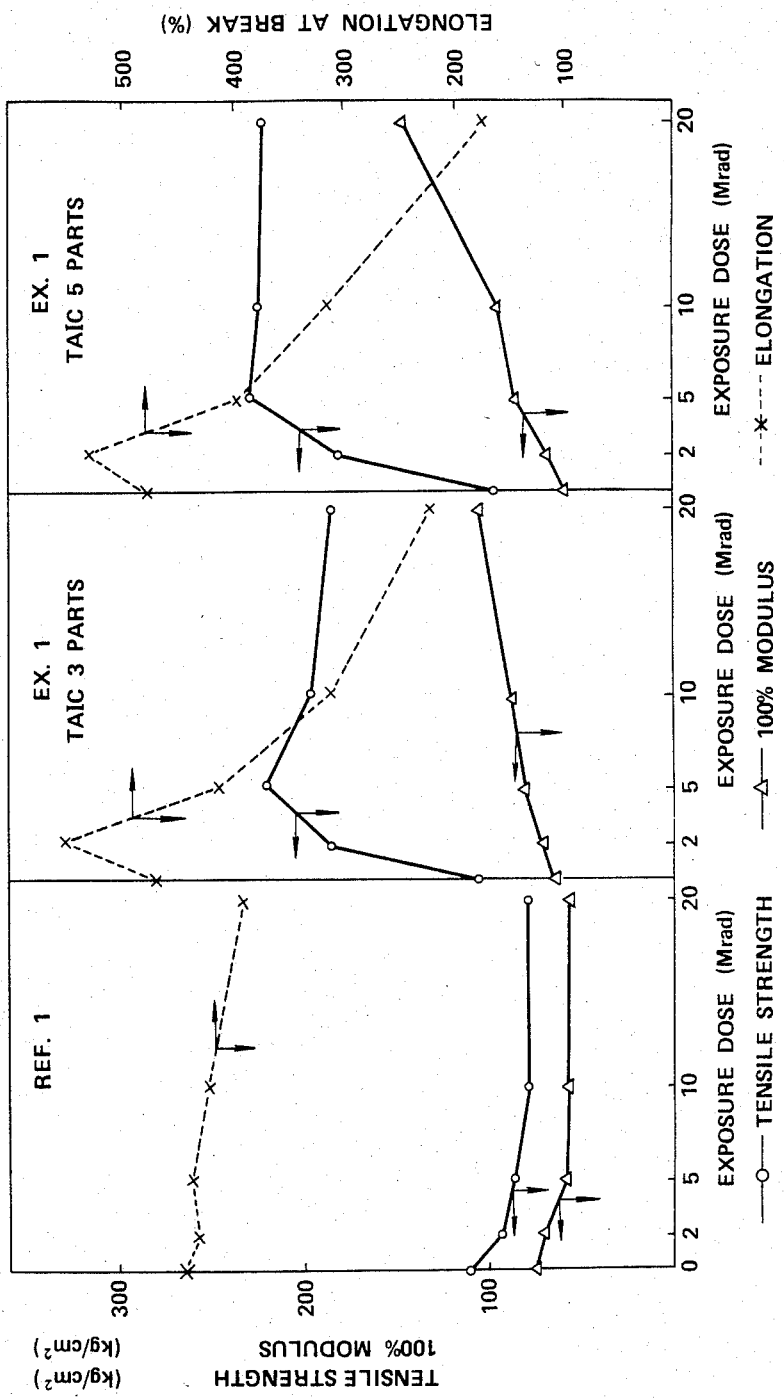
FIGS. 1(A), 1(B) and 1(C) are graphs showing the effects of irradiation with gamma-rays on the tensile characteristics of samples of a fluorine-containing graft copolymer.

The fluorine-containing graft copolymers used in this invention and methods of producing the same are shown in U.S. Pat. No. 4,472,557. The basic or "trunk" part of the graft copolymer is an elastomeric copolymer, which is obtained by copolymerizating at least one kind of fluorine-containing monomer and another kind of monomer that has both double bond and peroxy bond (such a monomer will be called an unsaturated peroxide) at a temperature at which the peroxy bond in the unsaturated peroxide does not decompose. Examples of useful unsaturated peroxides are t-butyl peroxymethacrylate, t-butyl peroxyallylcarbonate, di(t-butylperoxy)fumarate, t-butyl peroxycrotonate and p-menthane peroxyallylcarbonate. For example, the elastomeric copolymer may be a ternary copolymer of vinylidene fluoride (VDF), hexafluoropropene (HFP) and an unsaturated peroxide, a ternary copolymer of VDF, chlorotrifluoroethylene (CTFE) and an unsaturated peroxide or a quaternary copolymer of VDF, HFP, tetrafluoroethylene (TFE) and an unsaturated peroxide. The copolymerization reaction is carried out by using a radical polymerization initiator which may be an inorganic peroxide, water- or oil-soluble organic peroxide, azo compound or a redox type initiator. As to the manner of copolymerization reaction, emulsion polymerization using an emulsifying agent, suspension polymerization using a suspension stabilizing agent or solution polymerization using either an organic solvent or a mixture of water and an organic solvent is desirable.

At the next, stage, a fluorine-containing crystalline polymer is grafted to the basic elastomeric copolymer by polymerizing a suitable fluorine-containing monomer in the presence of the basic elastomeric copolymer at a temperature high enough to decompose the peroxy bond in the basic copolymer. For example, the fluorine-containing monomer is VDF, TFE, mixture of TFE and ethylene, mixture of TFE and HFP, or a mixture of TFE and perfluorovinyl ether. It is desirable to carry out the graft copolymerization reaction in the manner of emulsion polymerization in an aqueous medium, suspension polymerization in an aqueous medium or solution polymerization in an organic solvent. There is no need of using a radical polymerization initiator since graft copolymerization is initiated by decomposition of the peroxy bond in the elastomeric copolymer. In general the elastomeric copolymer as the "trunk" part of the graft copolymer has a glass transition temperature below room temperature, and the grafted crystalline polymer has a melting point not lower than 130° C.

Before forming a fluorine-containing graft copolymer into a desired shape, triallylisocyanurate must be added to the copolymer. The amount of triallylisocyanurate per 100 parts by weight of the graft copolymer is limited within the range from 0.1 to 10 parts by weight, and a narrower range from 0.5 to 5 parts by weight is preferable. If the amount of triallylisocyanurate is less than 0.1 parts by weight it is difficult to attain desired improvements on the properties of the copolymer by the subsequent irradiation. Although good results can be obtained even when the amount of triallylisocyanurate is more than 10 parts by weight, the use of such a large amount of triallylisocyanurate is unnecessary and rather unfavorable because the offensive smell of this compound becomes a serious problem and, moreover, bleeding of this additive is likely to occur during the shaping operation.

The graft copolymer containing triallylisocyanurate is formed into a desired shape by a conventional method such as calendering, extrusion, compression moudling, injection moudling, rotational moudling, or transfer moudling.

The shaped body of the graft copolymer is exposed to ionizing radiation for the purpose of cross-linking. As the ionizing radiation, alpha-ray, beta-ray, gamma-ray, neutrons, accelerated particles or X-ray can be used. As the radiation sources of use for this purpose, radioactive isotopes such as cobalt-60, cesium-137 and krypton-85, nuclear reactor, particle accelerators of various types, X-ray generators and electron beam generators are named as examples.

In this irradiation treatment, it is suitable that the exposure dose falls in the range from 0.1 to 20 Mrad. The exposure dose rate is variable over a wide range. If the exposure dose is less than 0.1 Mrad it is difficult to attain desired improvements on the physical properties of the shaped copolymer. On the other hand, deterioration of the irradiated copolymer begins as the exposure exceeds 20 Mrad.

The invention will further be illustrated by the following nonlimitative examples.

EXAMPLE 1

At the first step, 15 kg of purified water, 50 g of potassium persulfate, 3.8 g of ammonium perfluorooctanoate and 25.6 g of t-butyl peroxyallylcarbonate (BPAC) were put into a 30-liter stainless steel autoclave. After exhausting the autoclave of the gas atmosphere, 2700 g of VDF monomer and 2110 g of CTFE monomer were charged into the autoclave. The resultant mixture was subjected to copolymerization reaction at 48° C. for 22 hr with continuous stirring. The slurry containing the reaction product was subjected to salting-out and then was filtered to recover a VDF/CTFE/BPAC copolymer in the form of powder, which was washed with water and dried under vacuum. The yield of the copolymer was 85%.

At the second step, 1200 g of the VDF/CTFE/BPAC copolymer and 8000 g of trichlorotrifluoroethane were put into a 10-liter stainless steel autocalve. After exhausting the autoclave of the gas atmosphere, VDF monomer was continuously introduced into the autocalve to carry out graft copolymerization reaction at 98° C. while the pressure in the autoclave was kept at 9 kg/cm$^2$. The reaction was continued for 24 hr with continuous stirring. The slurry containing the reaction product was filtered, and the solid matter was dried to obtain 1500 g of a fluorine-containing graft copolymer in the form of powder. By differential scanning calorimetry (DSC) the melting point of this graft copolymer was measured to be 163° C.

Figure 2:
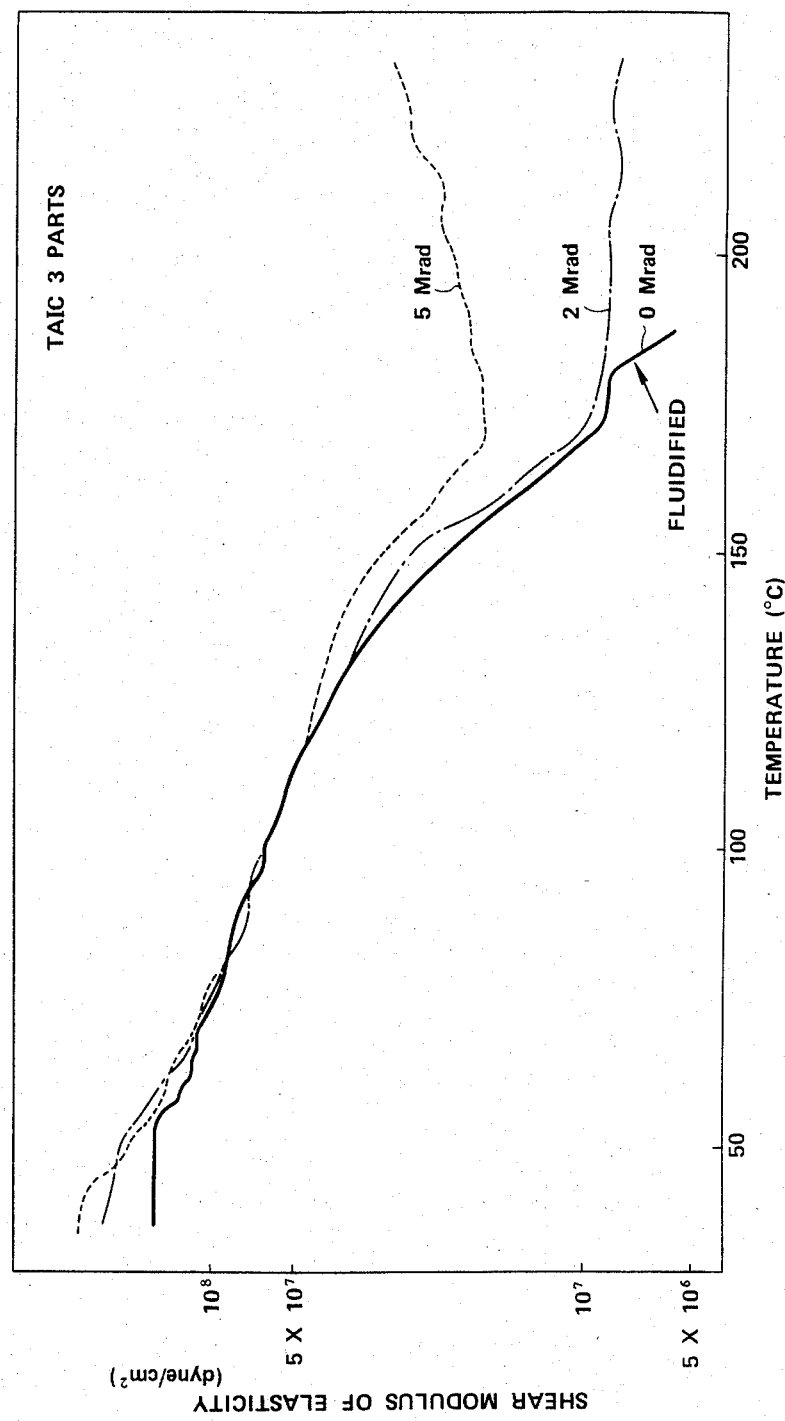
FIG. 2 is a graph showing the effects of irradiation with gamma-rays on the dynamic viscoelasticity of a sample of the same graft copolymer.

A mixture of 100 parts by weight of the fluorine-containing graft copolymer obtained by the above process and 3 parts by weight of triallylisocyanurate (abbreviated to TAIC) was kneaded by means of two rolls kept heated at 180° C. and then was press-shaped into 1 mm thick sheet. This sheet was semitransparent and flexible. Another mixture of 100 parts by weight of the same graft copolymer and 5 parts by weight of TAIC was kneaded and press-shaped into 1 mm thick sheet under the same operation conditions. At room temperature, samples cut out of these two kinds of sheets were irradiated with gamma-rays. The exposure dose was variably controlled to 2 Mrad, to 5 Mrad, to 10 Mrad and to 20 Mrad. After that, tensile strength and elongation of each sample were measured by using the dumb-bell type test pieces (No. 3 according to JIS K 6301). The test temperature was 23° C., and the pull rate 200 mm/min. The results are shown in Table 1 and in FIGS. 1(A) and 1(B). Besides, dynamic viscoelastic behaviors of some samples were measured with a viscoelastometer of the torsional free-damping type. The results are shown in FIG. 2.

REFERENCE 1

For comparison, the graft copolymer prepared in Example 1 was press-shaped into 1 mm thick sheet without addition of TAIC, and samles cut out of this sheet were irradiated with gamma-rays. The exposure dose was variable as noted in Example 1. After that, tensile strength and elongation of each sample were measured at 23° C. The results are shown in Table 1 and FIG. 1(C).

TABLE 1

| | Tensile Strength ($kg/cm^2$) | | | 100% Modulus ($kg/cm^2$) | | | Elongation (%) | | |
|---|---|---|---|---|---|---|---|---|---|
| | | Example 1 | | | Example 1 | | | Example 1 | |
| Exposure Dose (Mrad) | Ref. 1 | TAIC 3 parts | TAIC 5 parts | Ref. 1 | TAIC 3 parts | TAIC 5 parts | Ref. 1 | TAIC 3 parts | TAIC 5 parts |
| 0 | 109 | 105 | 97 | 74 | 65 | 60 | 444 | 467 | 477 |
| 2 | 91 | 185 | 182 | 68 | 71 | 69 | 429 | 548 | 526 |
| 5 | 86 | 222 | 231 | 58 | 79 | 87 | 440 | 410 | 392 |
| 10 | 78 | 196 | 224 | 57 | 89 | 95 | 423 | 311 | 316 |
| 20 | 79 | 185 | 224 | 56 | 105 | 148 | 390 | 222 | 172 |

EXAMPLE 2

To prepare a VDF/CTFE/BPAC copolymer, the first step of Example 1 was repeated except that the quantity of VDF monomer was increased to 3100 g and the quantity of CTFE monomer to 1410 g. In this case the yield of the copolymer was 89.4%.

At the second step, 3600 g of the VDF/CTFE/BPAC copolymer prepared in this example and 25 kg of trichlorotrifluoroethane were put into a 30-liter stainless steel autoclave. After exhausting the autoclave of the gas atmosphere, VDF monomer was continuously introduced into the autoclave to carry out graft copolymerization reaction at 98° C. while the pressure in the autoclave was kept at 11.5 kg/cm². The reaction was continued for 24 hr with continuous stirring. The slurry containing the reaction product was filtered, and the solid matter was dried to obtain 4970 g a graft copolymer in the form of powder. By DSC, the melting point of this graft copolymer was measured to be 165° C.

Figure 3:
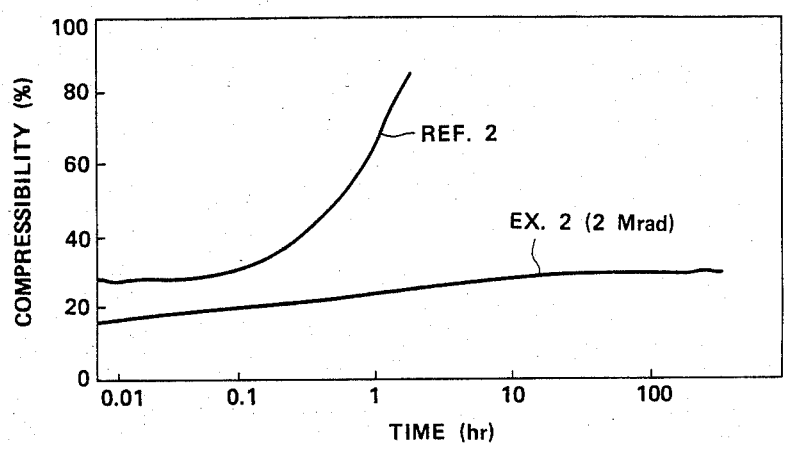
FIG. 3 is a graph showing the effects of irradiation with gamma-rays on the compression creep of different samples of the same graft copolymer.

A mixture of 100 parts by weight of the graft copolymer obtained by the above process and 3 parts by weight of TAIC was kneaded by means of two rolls kept heated at 180° C. and then was press-shaped at 220° C. into 1 mm thick sheet. This sheet was semitransparent and flexible. Besides, a portion of the kneaded mixture was moulded into disc-shaped test pieces (29 mm in diameter and 12.7 mm in thickness). At room temperature, samples cut out of the sheet and the disc-shaped test pieces were irradiated with gamma-rays. The exposure dose was variably controlled to 1 Mrad, to 2 Mrad and to 3 Mrad. After that, tensile strength and elongation of each sample of the sheet were measured at 23° C. by the same method as in Example 1, and the disc-shaped test pieces were kept compressed for 24 hr at 120° C. to reduce thickness by 25% as a procedure to measure compression set. The results are shown in Table 2. A portion of the disc-shaped test pieces irradiated at exposure dose of 2 Mrad were subjected to measurement of compression creep at 150° C. under a load of 25 kgf/cm². The result is shown in FIG. 3.

REFERENCE 2

For comparison, the graft copolymer prepared in Example 2 was shaped into 1 mm thick sheet and also into the aforementioned disc-shaped test pieces without addition of TAIC. Samples cut out of the sheet and the disc-shaped test pieces were subjected to the test described in Example 2. The results are shown in Table 2 and FIG. 3.

TABLE 2

| | Exposure Dose (Mrad) | Tensile Strength ($kg/cm^2$) | 100% Modulus ($kg/cm^2$) | Elongation (%) | Compression Set (%) |
|---|---|---|---|---|---|
| Ref. 2 | — | 260 | 95 | 521 | 59 |
| Ex. 2 | 1 | 299 | 115 | 435 | 52 |
| Ex. 2 | 2 | 349 | 116 | 426 | 43 |
| Ex. 2 | 3 | 327 | 123 | 398 | 38 |

The experimental data in the Tables and Figures demonstrate that the mechanical strength of the fluorine-containing graft copolymers cannot be enhanced by merely exposing the copolymers to ionizing radiation, and that when triallylisocyanurate is added in advance the irradiation treatment produces improvements in the tensile strength and compression set, and also in the heat resistance, even though the exposure dose is relatively small. It is certain that such improvements are attributed to cross-linking of the graft copolymers induced bt the radiation.

What is claimed is:

1. A method of producing a shaped body of fluorine-containing graft copolymer, the method comprising the steps of:
 preparing a mixture of 100 parts by weight of a fluorine-containing graft copolymer and from 0.1 to 10 parts by weight of triallylisocyanurate, said graft copolymer comprising a first segment, which is a fluorine-containing elastomeric copolymer selected from the group consisting of copolymers of vinylidene fluoride, hexafluoropropene and another monomer which has both double bond and peroxy bond, copolymers of vinylidene fluoride, chlorotrifluoroethylene and said another monomer and copolymers of vinylidene fluoride, hexafluoropropene, tetrafluoroethylene and said another monomer, and a second segment which is a fluorine-containing crystalline polymer selected from the group consisting of polyvinylidene fluoride, polytetrafluoroethylene, copolymers of tetrafluoroethylene and ethylene, copolymers of tetrafluoroethylene and hexafluoropropene and copolymers of tetrafluoroethylene and perfluorovinyl ether and is substantially grafted to said first segment;

forming said mixture into a desirably shaped body by application of heat; and exposing the shaped body to ionizing radiation to thereby cause cross-linking of said graft copolymer formed into said shaped body.

2. A method according to claim 1, wherein the exposure dose at the irradiation step is in the range from 0.1 to 20 Mrad.

3. A method according to claim 2, wherein said exposure dose is in the range from 0.5 to 10 Mrad.

4. A method according to claim 1, wherein the quantity of said triallylisocyanurate in said mixture is in the range from 0.5 to 5 parts by weight.

5. A method according to claim 1, wherein said another monomer is selected from the group consisting of t-butyl peroxymethacrylate, t-butyl peroxyallylcarbonate, di(t-butylperoxy)fumarate, t-butyl peroxycrotonate and p-menthane peroxyallylcarbonate.

6. A method according to claim 1, wherein said second segment has a melting point not lower than 130° C. and said first segment has a glass transition temperature below room temperature.

7. A method according to claim 1, wherein said graft copolymer comprises a copolymer of vinylidene fluoride, chlorotrifluoroethylene and said another monomer as said first segment and a polymer of vinylidene fluoride as said second segment.

8. A shaped body of a cross-linked fluorine-containing resin composition, said resin composition being a mixture of 100 parts by weight of a fluoride-containing graft copolymer and from 0.1 to 10 parts by weight of triallylisocyanurate, said graft copolymer comprising a first segment, which is a fluorine-containing elastomeric copolymer selected from the group consisting of copolymers of vinylidene fluoride, hexafluoropropene and another monomer which has both double bond and peroxy bond, copolymers of vinylidene fluoride, chlorotrifluoroethylene and said another monomer and copolymers of vinylidene fluoride, hexafluoropropene, tetrafluoroethylene and said another monomer, and a second segment which is a fluorine-containing crystalline polymer selected form the group consisting of polyvinylidene fluoride, polytetrafluoroethylene, copolymers of tetrafluoroethylene and ethylene, copolymers of tetrafluoroethylene and hexafluoropropene and copolymers of tetrafluoroethylene and perfluorovinyl ether and is substantially grafted to said first segment, said resin composition having become cross-linked by exposing said resin composition to ionizing radiation after forming said resin composition into the shaped body.

9. A shaped body according to claim 8, wherein the quantity of said triallylisocyanurate in said mixture is in the range from 0.5 to 5 parts by weight.

10. A shaped body according to claim 8, wherein said another monomer is selected from the group consisting of t-butyl peroxymethacrylate, t-butyl peroxyallylcarbonate, di(t-butylperoxy) fumarate, t-butyl peroxycrotonate and p-menthane peroxyallylcarbonate.

11. A shaped body according to claim 8, wherein said second segment has a melting point not lower than 130° C. and said first segment has a glass transition temperature below room temperature.

12. A shaped body according to claim 8, wherein said graft copolymer comprises a copolymer of vinylidene fluoride, chlorotrifluoroethylene and said another monomer as said first segment and a polymer of vinylidene fluoride as said second segment.

* * * * *